(12) United States Patent
Arauz Rosado (10) Patent No.: US 8,544,080 B2
(45) Date of Patent: Sep. 24, 2013

(54) MOBILE VIRTUAL PRIVATE NETWORKS

(75) Inventor: Jesus Javier Arauz Rosado, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 374 days.

(21) Appl. No.: 12/097,716

(22) PCT Filed: Jun. 12, 2008

(86) PCT No.: PCT/US2008/066746
§ 371 (c)(1),
(2), (4) Date: Sep. 29, 2010

(65) Prior Publication Data
US 2010/0281251 A1    Nov. 4, 2010

(51) Int. Cl.
*G06F 9/00* (2006.01)
*G06F 15/16* (2006.01)
*G06F 17/00* (2006.01)

(52) U.S. Cl.
USPC .......... 726/15; 726/2; 726/3; 726/11; 726/12; 726/14; 726/27; 726/30; 713/151; 713/154; 713/160; 713/162; 713/190; 709/225; 709/228; 709/229; 709/231; 370/230; 370/351; 370/352

(58) Field of Classification Search
USPC ........................................................ 713/152
See application file for complete search history.

(56) References Cited

U.S. PATENT DOCUMENTS

| | | | |
|---|---|---|---|
| 8,312,532 B2 * | 11/2012 | Takeyoshi et al. | 726/15 |
| 2007/0127382 A1 * | 6/2007 | Hussain et al. | 370/235 |
| 2008/0144494 A1 * | 6/2008 | Casey | 370/230 |
| 2008/0151873 A1 * | 6/2008 | Borsetti | 370/352 |
| 2009/0013380 A1 * | 1/2009 | Chandrasiri et al. | 726/3 |
| 2009/0041006 A1 * | 2/2009 | Chiu | 370/352 |

OTHER PUBLICATIONS

Townsley, W. et al.: "Layer Two Tunneling Protocol 'L2TP'" Network Working Group, Request for Comments: 2661. Category: Standards Track. The Internet Society, 1999.
Hameleers et al.: "IP Technology in WCDMA/GSM Core Networks", Ericsson Review, No. 1, pp. 14-27, 2002.
Olsson, U.: "Toward the All-IP Vision", Ericsson Review, No. 1, 2005.
Fasbender, A. et al.: "Virtually at home: High-performance access to personal media", Ericsson Review, No. 2, pp. 58-63, 2008.
3GPP Technical Specification TS 24.229 V7.11.0, IP Multimedia Call Control Protocol Based on Session Initiation Protocol (SIP) and Session Description Protocol (SDP), Stage 3, Release 7, Mar. 2008.

* cited by examiner

*Primary Examiner* — Nathan Flynn
*Assistant Examiner* — Bryan Wright
(74) *Attorney, Agent, or Firm* — Potomac Patent Group PLLC (57) ABSTRACT

An apparatus for establishing a virtual private network with an internet protocol multimedia subsystem (IMS) device that includes a key derivation module, a tunneling protocol module, a tunnel management module, and a security policies module. The apparatus includes a non-volatile memory configured to store a first routing table that maps host addresses and IMS addresses of security devices allowing access to those hosts, such that when an application running in the IMS device requests communication to a host address, the apparatus initiates a session with the IMS address to which the host address is mapped. The session is initiated by a message that includes a body that contains, for each tunneling protocol supported by the tunneling protocol module, data about the local tunnel endpoint (e.g., an address and a port), an identifier corresponding to the tunneling protocol, and identifiers corresponding to the cryptographic suite(s) supported by the cryptographic module that may be applied together with the tunneling protocol, as determined by a query from the apparatus to the security policies module.

20 Claims, 8 Drawing Sheets

MOBILE VIRTUAL PRIVATE NETWORKS

BACKGROUND

This invention relates to electronic communication systems, and more particularly to mobile electronic communication systems.

Data communication networks can be classified according to a number of criteria, including for example the "reachability" of the hosts connected to a network. A "host" is generally a computer, such as a server, that provides client stations with access to files and printers as shared resources on the network, and a host is "reachable" if a device can communicate with the host. If a first host is reachable from any other host connected to any other data network, such as the Internet for example, then the data network to which the first host is connected is usually said to be a "public" network, or an "open" network, or even just the "Internet". If the first host can be reached only from other hosts directly connected to the same data network as the first host, then that data network is said to be a "private" network, or a "closed" network, or just an "intranet".

Figure 1:
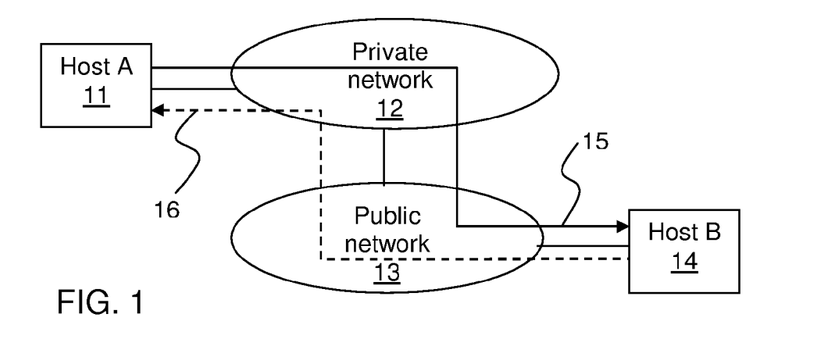
FIG. 1 depicts a private network connected to a public network.

Many modern business organizations and even individuals own private networks they use for their respective purposes. Although such private networks often are physically connected to public networks such that hosts in the private networks may reach hosts in the public networks, they continue to be private as long as the hosts in the private networks are not reachable by hosts in the public networks. This is illustrated by FIG. 1, which shows a Host A 11 that is connected to a private network 12 and a Host B 14 that is connected to a public network 13. The networks 12, 13 are connected, and the Host A is able to send data 15 to the Host B, as depicted by the solid line, but the Host B 14 is unable to send data 16 to the Host A 11, as depicted by the dashed line.

Like FIG. 1, workers in many modern organizations are not able to connect their respective hosts (i.e., Host B in FIG. 1) to hosts in their organizations' private networks (i.e., Host A in FIG. 1) for economic, physical, security, or other reasons. If such connections are needed, a Virtual Private Network (VPN) can be used. A VPN refers to the situation where two or more private networks physically interconnected by a public network appear to be a single private network (i.e., a "virtual" private network). Thus, a host outside one of the real private networks is allowed to access hosts inside that one of the real private networks as long as the host is connected to a real private network that is part of the virtual private network.

Figure 2:
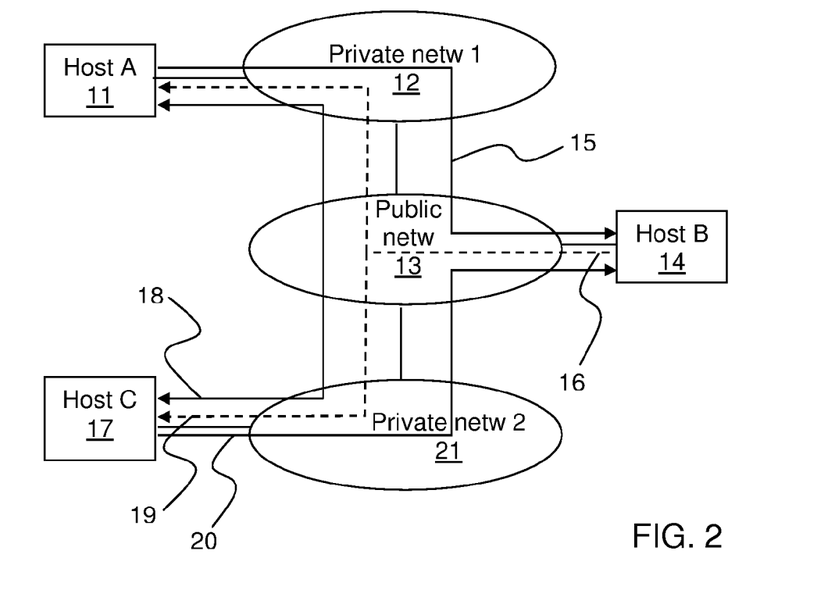
FIG. 2 depicts a virtual private network.

FIG. 2 depicts such a VPN. As in FIG. 1, the Host A 11 is connected to a first private network 12 and is able to send data 15 to the Host B 14 that is connected to a public network 13, and the Host B 14 is unable to send data 16 to the Host A 11. The Host A 11 is also able to send and receive data 18 to a Host C 17 that is connected to a second private network 21. In the same way, Host C 17 is able to send data 20 to Host B 14, but Host B 14 is unable to send data 19 to Host C 17. In the arrangement depicted in FIG. 2, the real private networks 12, 21 are part of a wider "virtual" private network.

One common way of implementing a VPN is by an Internet Protocol Security (IPSec) tunnel. IPSec is a network-layer protocol suite for sending and receiving internet protocol (IP) digital data packets, or blocks, by communicating devices ("peers"), such as routers, in a computer network. IPsec supports transport and tunnel encryption modes. In the transport mode, an IPSec device at the source, or sender, encrypts the data (payload) of each packet, but not the packet header, and in the tunnel mode, the sending IPSec device encrypts the header and the payload of each packet. At the destination, or receiver, of the packets, an IPSec device decrypts each packet. Thus, an IPSec tunnel is implemented by a tunneling protocol, i.e., a protocol that is able, in a transparent way, to carry other protocols inside it.

Figure 3:
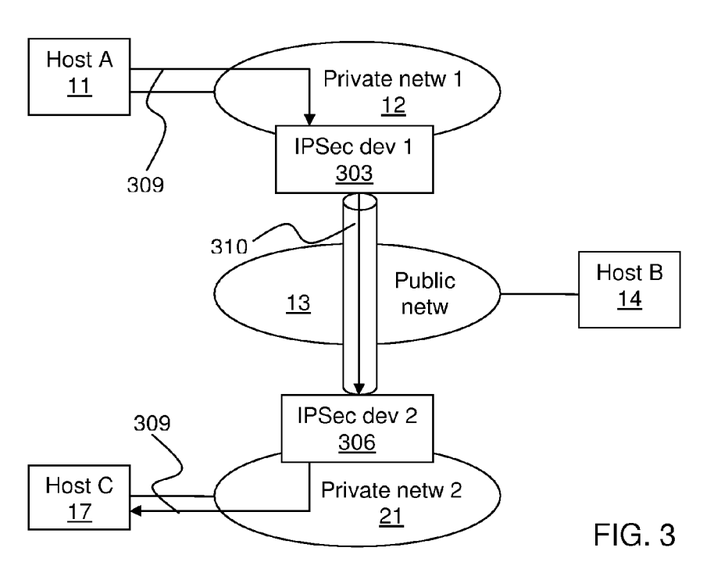
FIG. 3 depicts a virtual private network with IPSec tunnels.

In a typical arrangement, one IPSec tunnel is established between every pair of real private networks that are part a VPN, but other arrangements, such as a star configuration, are also possible. This is illustrated by FIG. 3, in which an IPSec tunnel between the Host A 11 and Host C 17 is physically supported by a first IPSec device 303 that is connected to the private network 12 and a second IPSec device 306 that is connected to the private network 21. The IPSec device 303 receives a data packet 309 from the Host A 11, encapsulates it in a data packet 310 that is authenticated and/or encrypted using an agreed-on cryptographic suite, and then forwards the protected data packet 310 to the (remote) IPSec device 306. The IPSec device 306 performs the opposite operations, i.e., it removes the protection from the data packet 310 and extracts the encapsulated packet 309, which it then forwards to its destination, Host C 17.

It will be noticed from FIG. 3 that because hosts in the public network 13, e.g., Host B 14, have not agreed on the cryptographic suite with either IPSec device 303, 306, such hosts are unable to decipher the data packets in the "tunnel" between the private networks 11, 21. This in itself does not change the private or public condition of the networks involved, but in most cases it is convenient to allow hosts in a private network to access hosts in a public network. Thus, IPSec devices are able to detect when a data packet is addressed to a host in a real private network that is part of the VPN and when a data packet is addressed to a host in a public network, and to avoid protecting or tunneling the latter.

Figure 4:
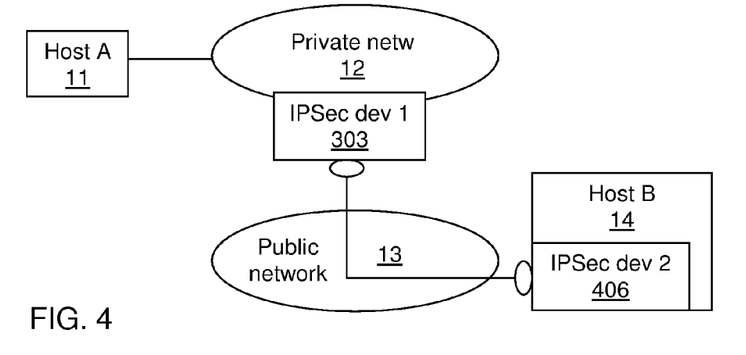
FIG. 4 depicts another form of virtual private network.

FIG. 4 depicts a VPN configured with the Host A 11 connected to the private network 12 that is connected through the IPSec device 303 to the public network 13. The Host B 14 is also connected to the public network 13, but through an IPSec device 406 contained in or associated with the Host B 14. This kind of VPN configuration can occur when an employee is outside all of the real private networks owned by an organization and has a connection to a public network as the only way to access the organization's network(s). The IPSec device 406 that is necessary to support the remote worker host's end of the IPSec tunnel is typically collocated with the remote worker's host as depicted in FIG. 4, and operates in a manner that corresponds to that of the device 306.

To establish an IPSec tunnel between two IPSec devices, a Security Association (SA) is created locally at each IPSec device. The SA is a container for the tunnel's characteristics, including the source and destination IP addresses, a tunnel identifier, cryptographic suite(s) to use for encryption and/or authentication, and keys to use with the suite(s). A SA can be set up manually, for example by having a network administrator configure each IPSec device, or automatically, for example by having the IPSec devices exchange messages using a protocol called Internet Key Exchange (IKE). The IKE protocol enables secure negotiation of cryptographic suites for encryption and/or authentication and secure exchange of the keys to be used. The IKE protocol also enables changing the keys dynamically during the life of a tunnel to further strengthen the security of the tunnel.

Implementing IPSec tunnels between the different real-private-network parts of a VPN is difficult. The administrator or administrators of the private networks need to configure an IPSec device for each respective real private network with an initial SA for each tunnel. When the IKE protocol is not used, all of the SA information has to be provided by the administrator (manual configuration); otherwise, only the source and destination network addresses and SA identifier need to be provided.

Configuring even just the source and destination network addresses at each IPSec device poses the problem that when one of those addresses changes, all of the IPSec devices that hold a tunnel to the IPSec device with the changed address need to be updated. As the number of IPSec tunnels in a VPN increases, the tunnel management burden increases as well. In a mesh configuration, the time complexity increases as $\Theta(2^n)$, which is to say, on the order of $2^n$, and in a star configuration, the burden increases as $\Theta(n)$, which is to say linearly with n, where n is the number of tunnels.

The private network administrator or administrators also need to deploy and manage the keys used for encryption and/or authentication for each IPSec tunnel. Key delivery and management poses multiple security risks, since if even one key is compromised, an unauthorized party using the leaked key and a host in a public network might be able to decrypt and, even worse, authenticate packets exchanged with the private network(s). In the case illustrated by FIG. 4, the risk of key leakage is greatly increased. To tackle such risks, organizations burden their remote workers with "strong" key management processes, like smart cards for generating one-use passwords, "hard tokens", etc.

Moreover, the very notion of an SA is eminently static, in that SAs need to be manually created in the IPSec devices at each end of a tunnel, at least to some extent. It is thus not possible to establish tunnels between devices when one device does not "know" the other (i.e., one peer does not have a pre-configured SA with the other peer's address). After a tunnel is established, the cryptographic suites used to encrypt and/or authenticate traffic through the tunnel cannot be changed without shutting down the tunnel and then re-establishing a tunnel with the new suites. In a VPN having one or more single-host private networks as in FIG. 4, it is usually not possible to send data packets to one of those remote hosts unless that host's IPSec device has already established a tunnel to a peer IPSec device. The reason is that the remote hosts often have addresses that are dynamically assigned on connection to the VPN, and so the target host's address is not known until it actually connects to the VPN.

Wireless and other communication networks are typically built according to specifications promulgated by standardization organizations, such as the Third Generation Partnership Project (3GPP). 3GPP specifies the GSM telecommunication system and its enhancements, e.g., General Packet Radio Service (GPRS) and Enhanced Data Rates for GSM Evolution (EDGE), the universal mobile telecommunications system (UMTS), and systems employing wideband code-division multiple access (WCDMA).

Such networks can now include an IP Multimedia Subsystem (IMS) that uses the Session Initiation Protocol (SIP) as its basic signaling mechanism. SIP is a mechanism for finding and routing control signals between endpoints, and the typical IMS architecture is a framework of network elements that employ various SIP routing devices to fulfill different roles regarding service triggering, authentication and authorization, media plane resource invocation, network interconnect, topology hiding, scalability, resilience, and other network properties. The IMS is integrated into existing mobile communication network infrastructures by relying on the home subscriber server (HSS), including the Home Location Register (HLR) to provide subscriber information, and the security identity module (SIM) card in a user equipment (UE) to assist in verifying the end-user, device, charging, media gateways, and signaling gateways.

SUMMARY

In accordance with aspects of this invention, there is provided an apparatus for an IMS device that includes a key derivation module, a tunneling protocol module, a tunnel management module, a security policies module, and an ISIM/USIM application. The apparatus includes a non-volatile memory configured to store a first routing table that maps host addresses and IMS addresses of security devices allowing access to those hosts, such that when an application running in the IMS device requests communication to a host address, the apparatus initiates a SIP session with the IMS address to which the host address is mapped. The SIP session is initiated by a message that includes an SDP body that contains, for each tunneling protocol supported by the tunneling protocol module, data about the local tunnel endpoint (e.g., an IP address and UDP port), an identifier corresponding to the tunneling protocol, and identifiers corresponding to the cryptographic suite(s) supported by the cryptographic module that may be applied together with the tunneling protocol, as determined by a query from the apparatus to the security policies module.

In accordance with further aspects of this invention, there is provided a method of establishing an end-to-end transparent tunnel between two peer IMS devices. The method includes, upon request by an application to exchange a data packet with a remote host, finding, by an initiating IMS device, a IMS Public Identity of a peer IMS device that allows access to the remote host by looking up the remote host's address in a host-to-IMS device mapping table; and sending, from the initiating IMS device, a message to the peer IMS device that has a message body including a list of data structures, each structure corresponding to a tunneling protocol available to the initiating IMS device and including the local tunnel endpoint (e.g., IP address and UDP port), an identifier of the tunneling protocol, and as many identifiers of cryptographic suites as the initiating IMS device would accept to use together with the tunneling protocol.

In accordance with further aspects of this invention, there is provided a method of negotiating parameters of an end-to-end transparent tunnel between two peer IMS devices. The method includes receiving, by a terminating IMS device, a message sent by an initiating IMS device and extracting data structures corresponding to tunneling protocols included in a body of the message; removing, by the terminating IMS device from the body, those data structures corresponding to tunneling protocols it does not support or chooses not to accept, and removing, from each individual data structure, those identifiers of cryptographic suites it does not support or chooses not to accept together with the corresponding tunneling protocol; and including, by the terminating IMS device, an updated body in a response message that it sends to the initiating IMS device.

In accordance with further aspects of this invention, there is provided a method of completing establishment of a transparent end-to-end tunnel between two peer IMS devices. The method includes receiving, by a terminating IMS device, a SIP PRACK or UPDATE request from an initiating IMS device carrying an SDP body that includes an identifier of a tunneling protocol with associated identifier of cryptographic suite and keys to use with the suite; deriving, by the terminating IMS device, keys for authentication and/or encryption for the suite from the keys used to secure the SIP communication to the IMS network the terminating IMS device is using; creating, by the terminating IMS device, a local SA configured to authenticate and/or encrypt data blocks exchanged with the initiating IMS device using the suite, applying the keys obtained from the initiating IMS device to inbound data blocks and its own keys to outbound data blocks; and replacing, by the terminating IMS device, the keys received from the initiating IMS device with its own keys and sending the updated SDP body in a final SIP response to the initiating IMS device.

In accordance with further aspects of this invention, there is provided a method of completing establishment of a transparent end-to-end tunnel between two peer IMS devices. The method includes receiving, by an initiating IMS device, a final response from a terminating IMS device carrying an SDP body that includes an identifier of a tunneling protocol with associated identifier of cryptographic suite and keys to use with the suite; creating, by the initiating IMS device, a local SA configured to authenticate and/or encrypt data blocks exchanged with the terminating IMS device using the suite, applying the keys received from the terminating IMS device to inbound data blocks and its own keys to outbound data blocks; and sending, by the initiating IMS device, a SIP ACK request related to the INVITE/final response exchange.

In accordance with further aspects of this invention, there is provided a method of releasing an end-to-end transparent tunnel between two peer IMS devices. The method includes sending, by a releasing IMS device, a tunnel release request according to the transparent tunnel protocol to the released IMS device; sending, by the releasing IMS device, a SIP BYE message to the released IMS device, after which the tunnel is considered released from the releasing IMS device's viewpoint; receiving, by the released IMS device, the tunnel release request from the releasing IMS device that sends a tunnel release response to the releasing IMS device; and receiving, by the released IMS device, the BYE message from the releasing IMS device that sends a final response to the releasing IMS device, after which the tunnel is considered released from the released IMS device's viewpoint.

In accordance with further aspects of this invention, there is provided a method of changing the cryptographic suites for authentication and/or encryption being used in an already established end-to-end transparent tunnel between two peer IMS devices. The method includes selecting, by an initiating IMS device, identifiers from a list exchanged in a final response that correspond to cryptographic suites for encryption and/or authentication, the suites being different from those currently being used to encrypt and/or authenticate the data blocks exchanged through the already established tunnel; including, by the initiating IMS device, the selected identifiers together with the keys to use in the SDP body of a SIP INVITE message that it sends to the terminating IMS device, the INVITE message belonging to the context of the already established SIP session between both IMS devices; receiving, by a terminating IMS device, the INVITE message from the initiating IMS device that extracts the identifiers and keys from the SDP body in the message and updates its local SA to use the new cryptographic suites and keys for authentication and/or encryption; sending, by the terminating IMS device, a final response to the INVITE received, including an SDP body with its own keys to use with the cryptographic suites selected by the initiating IMS device; and receiving, by the initiating IMS device, the final response that updates its local SA to use the new cryptographic suites and keys for authentication and/or encryption.

BRIEF DESCRIPTION OF THE DRAWINGS

The various objects, features, and advantages of this invention will be understood by reading this description in conjunction with the drawings, in which.

DETAILED DESCRIPTION

This application focuses on an arrangement like that depicted in FIG. 4, because remote workers usually carry, in addition to a host with networking capabilities (e.g., a laptop computer), a device that can receive services from an IMS of a core network (e.g., a 3GPP-specified network). Nevertheless, it will be understood that the principles described in this application can be implemented in other communication systems.

The typical IMS device (e.g., a "smartphone") that can receive services from an IMS includes a strong authentication mechanism, e.g., an IP multimedia subscriber identity module (ISIM). An ISIM is an application, or computer program, residing on a universal integrated circuit card (UICC) that enables the IMS device to access IMS services. The ISIM is typically preconfigured with parameters necessary to initiate the IMS device's registration to the IMS, including a private user identity, one or more public user identities, and a home network domain name. The artisan will understand that the home network domain name is used to address a suitable message sent by the IMS device to request registration on the IMS. As described in more detail below, a suitable message is a SIP REGISTER request.

The inventor has recognized that such an IMS device can be used as the IPSec device needed to support an IPSec tunnel between private networks that is necessary to build a VPN. The IMS device is advantageously provided with two sides: an internal side that connects the device to other hosts in a secure network (e.g., a private data network), and an external side that connects the IMS device to an insecure network (e.g., a public data network).

It is assumed that to each private network that is to become part of a VPN, there is available an IMS device compliant with applicable IMS specifications, e.g., 3GPP Technical Specification (TS) 24.229 V7.11.0, IP Multimedia Call Control Protocol Based on Session Initiation Protocol (SIP) and Session Description Protocol (SDP), Stage 3, Release 7 (March 2008) specifies an IP Multimedia Call Control Protocol based on SIP and SDP. Section 5 of TS 24.229 specifies SIP usage at a UE, such as the IMS device, and Section 6 of TS 24.229 specifies SDP usage. SIP INVITE requests and IMS device call initiation are described in Section 5.1.3 of TS 24.229. Appendix B of TS 24.229 describes the procedures used by an IMS device, or UE, to access and use the services provided by an IMS of a core network, including packet data protocol context activation and discovery of a proxy call session control function (P-CSCF) in a GPRS gateway support node (GGSN). Networks including such functions and nodes are known and described as necessary below.

It is also assumed that a host or hosts in a private network are able to exchange data packets with the IMS device or devices available in that private network and that the IMS devices used as IPSec devices in respective private network have performed authentication and registration to the respective IMS networks to which the ISIMs in those IMS devices belong. Thus, IMS devices at both a source and a destination have respective IPSec tunnels established to their respective IMS networks' border devices (e.g., a P-CSCF in the case of a 3GPP-compliant mobile IMS network). The security of data packets exchanged over those IPSec tunnels and between IMS networks is guaranteed by the operators of the IMS networks.

It is important to note that IPSec tunnels established with respective IMS networks for IMS services cannot be re-used to tunnel VPN data packets because those tunnels are for exchanging only SIP signalling packets; any data packet not carrying SIP signaling will be blocked by the IMS networks' border devices. In addition, VPN data packets cannot be embedded in SIP signalling packets because the resultant volume of SIP traffic would heavily overload the devices handling the IMS network's control plane. Moreover, IMS networks usually operate the control plane according to policies that result in dropping any in-excess signalling packets produced by an IMS device.

In each private network that is to be part of a VPN, an apparatus is deployed that acts as a border element for the respective private network, i.e., the apparatus has an internal side and an external side as described above. It will be noted that the apparatus can be implemented as a computer software module executed by a programmable electronic processor in a host, for example in the case of a single-host private network like that depicted in FIG. 4. The apparatus supports one or more cryptographic suites and a tunneling protocol for respectively protecting/unprotecting and encapsulating/de-encapsulating data packets exchanged over its external side. A suitable tunneling protocol is the Layer 2 Tunneling Protocol (L2TP) specified in RFC 2661 by the Internet Engineering Task Force, although other tunneling protocols can be used in addition to, or instead of, L2TP without substantially departing from this invention.

Figure 5A:
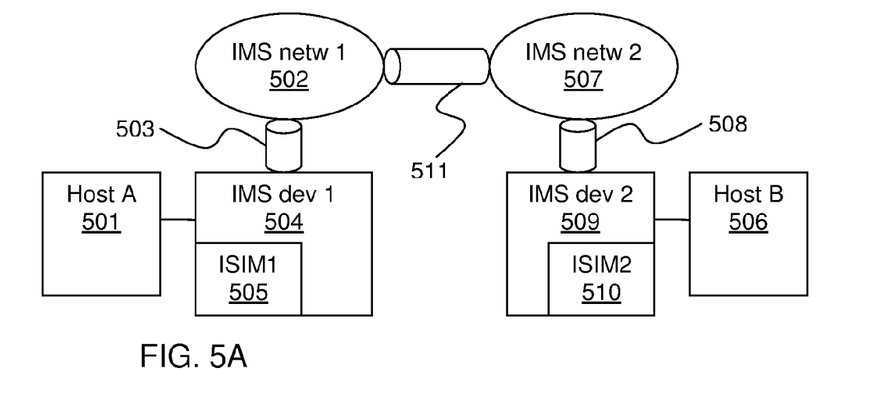
FIGS. 5A, 5B show a common network arrangement before and after establishment of a virtual private network.
Figure 5B:
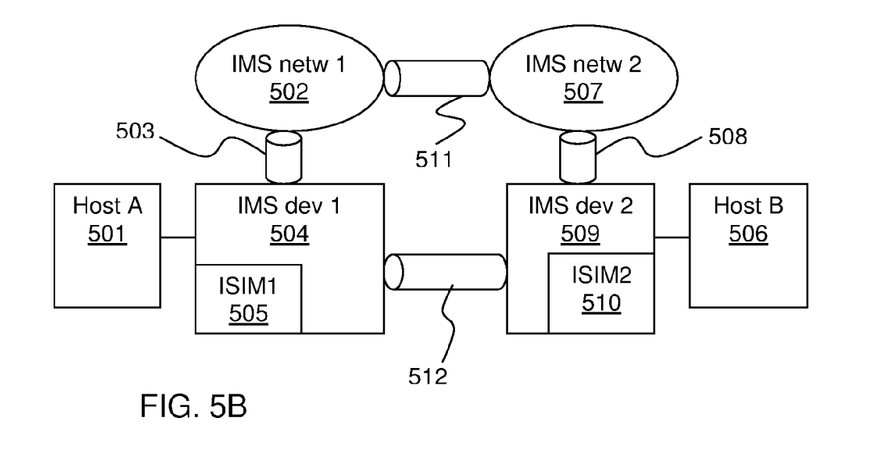

FIGS. 5A, 5B show a common network arrangement before (FIG. 5A) and after (FIG. 5B) a VPN tunnel has been established in accordance with this invention. In FIG. 5A, host A 501 has accessed a first IMS network 502 through a first IPSec tunnel 503 with a first IMS device 504, which includes an ISIM 505 as explained above, and similarly host B 506 has accessed a second IMS network 507 through a second IPSec tunnel 508 with a second IMS device 509, which includes an ISIM 510. The first and second IMS networks 502, 507 are connected through an IPSec tunnel 511 that is devoted to SIP signalling. In FIG. 5B, the IMS devices 504, 506 have established an IPSec tunnel 512 for VPN packets. It will be understood that the hosts 501, 506 can be accompanied by other hosts (not shown in FIG. 5) in respective private networks.

As described above, each IMS device 504, 509 registers and authenticates as necessary to the IMS network to which its respective ISIM 505, 510 belongs before providing its functionality to hosts in its respective private network. As part of the conventional registration procedure, each IMS device 504, 509 sets up the respective IPSec SA 503, 508 to a border element of the respective IMS network 502, 507 so that any SIP messages exchanged with that network are trusted and protected.

Whenever a host in a private network, e.g., host 501, wants to send a data packet to a host outside its own network, e.g., host 506, it sends the packet to the IMS device in its network, e.g., device 504, by conventional IP packet routing techniques. On receiving such a packet, the IMS device 504, which can be called the initiating IMS device, reads the packet's destination IP address, i.e., the address of the host outside the IMS device's own network. The initiating IMS device then maps the destination IP address to an IMS address by searching a routing table that may be stored in the IMS device. The routing table stores IP addresses in association with respective IMS addresses, such as IMS Public User Identities (IMPU IDs, in IMS terminology).

For example, relevant IMS device addresses can be configured in advance. An IP address that cannot be mapped into an IMS device address can mean the IP address corresponds to the external IP world so that either the message is rejected or a negative result code is returned towards the originating host 501 for the latter to submit the packet by conventional IP packet routing techniques and not via the IMS device.

After retrieving a respective (destination) IMS address from the routing table, the initiating IMS device apparatus initiates an IMS session with the retrieved destination IMS address, e.g., by sending a SIP INVITE or other suitable message to the destination address. The initiating IMS device includes in the session information the set of cryptographic suites it supports and suitable keying information for each suite that the initiating IMS device has automatically derived from the keying information in use in the IPSec tunnel with the IMS network. Authentication keys and encryption keys can be such keying information. The key for each suite can be obtained by deriving cryptographic material from a secret key stored in the ISIM, using a non-reversible algorithm so that the ISIM secret key cannot be obtained from the derived key.

A peer terminating IMS device, e.g., IMS device 509, receives the SIP INVITE or other suitable message, and analyzes the included session information, including the set of cryptographic suites supported by the initiating IMS device, e.g., IMS device 504. The terminating IMS device selects a cryptographic suite from the set of suites supported by the initiating IMS device that it supports and that it wants to use for the VPN IPSec tunnel 512. The terminating IMS device also selects the appropriate keying information for the selected cryptographic suite. The terminating IMS device replies to the initiating IMS device's initiation of the IMS session with a message, such as a 200 OK response, that includes the selected cryptographic suite and keying information.

In general, all IMS devices in the network are typically configured with all the relevant data to inter-operate, but if no identifier of a cryptographic suite remains in a response, a SIP session establishment negative response is passed to the SIP sender, which in turn returns the response to the sender of the SIP session establishment request.

The initiating and terminating IMS devices set up an IPSec SA, e.g., tunnel 512, that uses the cryptographic suite agreed in the 200 OK response, using the keying information derived by the respective IMS devices, and exchange signaling messages suitable for establishing a transparent tunnel protected by the respective SAs. Data packets received on the internal side of either the initiating or terminating IMS device that are addressed to a host located behind the other IMS device are protected with that device's SA and encapsulated in the tunnel to the other IMS device in the conventional manner of secure networking.

Thanks to the authenticated and encrypted IPSec tunnel already existing between the IMS device and the IMS network, e.g., tunnels 503, 508, 511 in FIG. 5, sensitive information included in the SIP INVITE message, e.g., the cryptographic key information, is protected from eavesdropping and can be safely exchanged with the peer IMS device.

On receiving a SIP INVITE message, a terminating IMS device verifies that the initiating IMS address is authorized to set up a tunnel with the device, and then it decodes the SDP body in the message and selects one or more of the cryptographic suites that it supports. The second routing table in the non-volatile memory maps between addresses of security devices and host addresses to which the devices allow access, and thus where the initiating IMS address is included in the second routing table, the terminating IMS device can conclude that the host identified by the corresponding mapped host address is authorized to access. The terminating IMS device then removes from the SDP body the identifiers of those suites it does not support, includes its own keys for the suites it does support, and replaces the user datagram protocol (UDP) port number included by the initiating IMS device with the number of its own local UDP port where it expects to send and receive the VPN data packets exchanged through the IPSec tunnel. In the conventional way, the IMS device derives its keys from the ISIM secret key as for the other IMS device. The terminating IMS device then includes the resulting SDP body in a provisional SIP response (e.g., a 183 response) that it sends to the peer that issued the INVITE.

If the SDP body returned by the peer IMS device contains at most one cryptographic suite for encryption and at most one cryptographic suite for authentication, the peer IMS device immediately issues a final SIP response (e.g., a 200 OK response) and sets up its internal IPSec module to send and receive packets through the port reported to the other IMS device using the agreed tunneling protocol and the cryptographic suite(s) that remained. Otherwise, a new message exchange is necessary between both IMS devices in order to agree on a cryptographic suite to use for authentication and a cryptographic suite to use for encryption. This exchange usually can take the form of an acknowledgment to the provisional response mentioned above (e.g., a PRACK message) followed by a corresponding final response (e.g., a 200 OK message), or alternatively an UPDATE message followed by a corresponding final response (e.g., a 200 OK message).

After the initiating and terminating IMS devices have agreed on authentication and/or encryption cryptographic suites and exchanged the key information to use them, both devices set up respective internal IPSec modules to send and receive data blocks through their respective announced local UDP ports, authenticated and/or encrypted using the agreed cryptographic suite(s) with the announced key(s) for each suite. The IMS devices also set up the protocol layer that encapsulates/extracts the data packets sent/received by the hosts at each end of the IPSec tunnel, and exchange the usual tunneling protocol-specific messages to establish the tunnel.

The characteristics of the IPSec tunnel, e.g., the tunnel 512, can be changed at any time by further exchanges of INVITE and 200 OK messages where different ports, cryptographic suite(s), and/or keys are agreed. This enables a low-strength protection suite to be used for exchanging non-confidential information and a higher-strength protection suite to be used for exchanging more sensitive information. This technique enables optimization of the computing resources in the IMS devices at each end of the tunnel.

An IPSec tunnel can be terminated at any time by an exchange of BYE and 200 OK messages, where the IMS device sending the BYE immediately stops sending and receiving data packets through the tunnel. If the tunneling protocol in use requires exchanging a tunneling protocol-specific message to shut down the tunnel, the IMS device can send that message right before sending the BYE message. When the peer IMS device receives the BYE message, it immediately sends a final 200 OK answer, and if no tunneling protocol-specific message has been received indicating that the tunnel has been shut down, it stops sending and receiving data packets through the tunnel.

Figure 6:
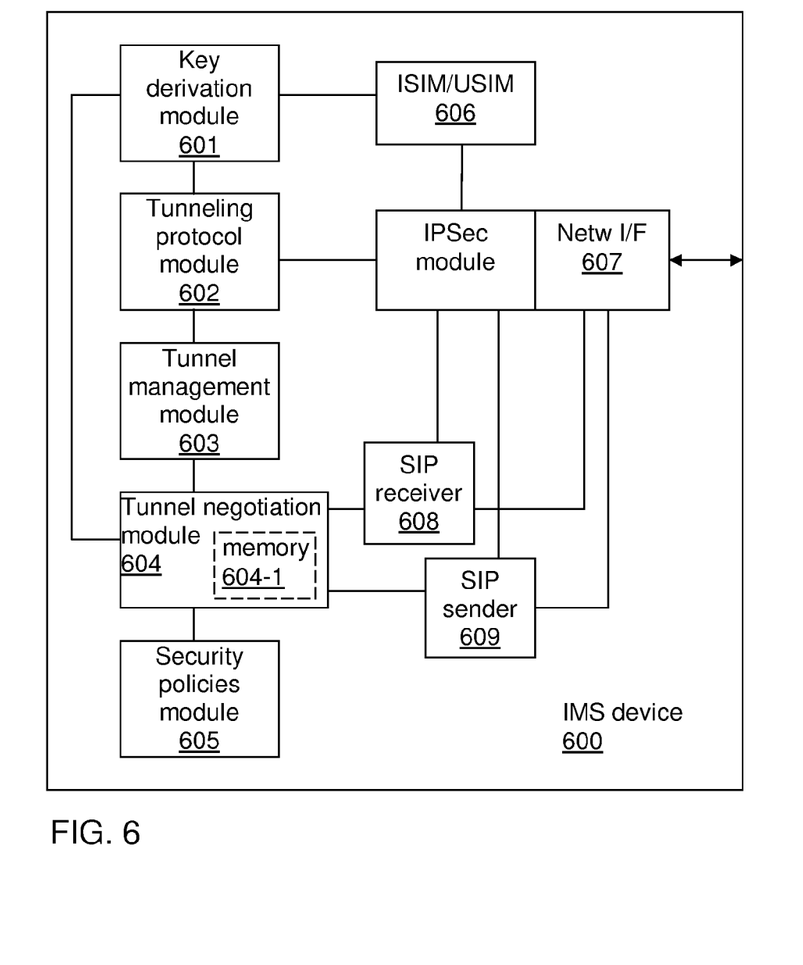
FIG. 6 is a block diagram of a device for establishing a virtual private network.

FIG. 6 is a block diagram of an exemplary IMS device 600 that can be used as either the initiating or terminating IMS devices 504, 509. Among other things, the IMS device 600 includes a key derivation module 601, a tunneling protocol module 602, a tunnel management module 603, a tunnel negotiation module 604, a security policies module 605, and an ISIM/USIM application 606. The key derivation module 601 generates cryptographic keys for encrypting and/or authenticating data packets by deriving the keys from the ISIM/USIM application 606. The tunneling protocol module 602 supports at least one tunneling protocol that enables at least two private networks to exchange data packets over a public network in such a way that the private networks appear to be one single network to hosts connected to them, which is to say, a VPN. The tunneling protocol module 602 supports at least one cryptographic suite that it can apply to incoming and outgoing data packets to encrypt/decrypt and/or authenticate the packets using keys provided by the key derivation module 601. The tunnel management module 603 operates to dynamically establish and release secure tunnels to remote IMS devices, e.g., by generating, exchanging, and analyzing SIP messages as described above. The security policies module 605 determines the at least one cryptographic suite to be used with each tunneling protocol supported by the tunneling protocol module 602.

The tunnel negotiation module 604 includes a non-volatile memory 604-1 that is configured to store a routing table that maps host addresses and IMS addresses of other IMS devices that allow access to those hosts. When an application running in the IMS device 600 requests communication to a host address, the module 604 initiates a SIP session by sending a SIP INVITE request to the IMS address to which the host address is mapped in the stored routing table. The INVITE request preferably includes an SDP body that contains, for each tunneling protocol supported by the tunneling protocol module 602, data about the local tunnel endpoint (e.g., an IP address and UDP port), an identifier corresponding to the tunneling protocol, and identifiers corresponding to the cryptographic suite(s) supported by the IMS device 600 that may be applied together with the tunneling protocol, as determined by a query from the module 604 to the security policies module 605.

Figure 7A:
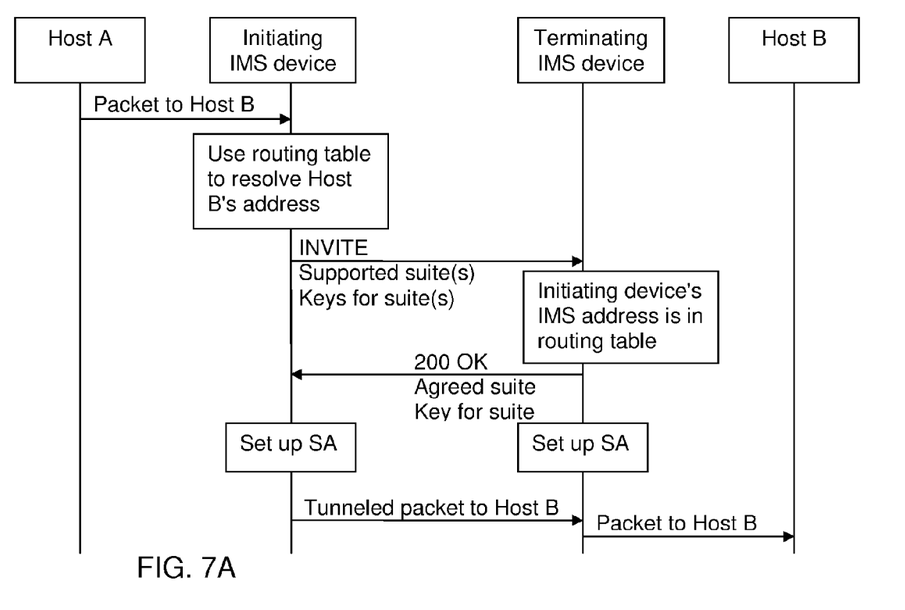
FIGS. 7A, 7B depict methods of establishing a virtual private network.

FIG. 7A illustrates a method of establishing a VPN that is in accordance with this invention. The IMS device associated with the sending Host A, which can be called the initiating IMS device, receives on its internal side one or more data packets intended for a receiving Host B, which is not in Host A's secure network. The initiating IMS device matches the receiving host's address against a routing table in an effort to find an IMS address corresponding to the host address. If the match succeeds, i.e., if the address is found in the routing table, the initiating IMS device sets up an IMS session (e.g., by sending a SIP INVITE request) to the IMS address located, and negotiates with the peer IMS device, which can be called the terminating IMS device, at the Host B bound to that IMS address the usage of a cryptographic suite with keys derived from the ISIM-based strong authentication mechanism, without any manual intervention. As explained in more detail below, the negotiation can involve the terminating IMS device checking its own routing table for an IMS address corresponding to Host A's address, and sending one or more suitable messages (e.g., a SIP 200 OK message) to Host A.

After both host have set up SAs for the VPN session, the data packet and any other data packets addressed to a host address that resolves to the aforementioned IMS address are protected with the negotiated cryptographic suite and keys. It will be understood that any IMS address resolved by the IMS device just described corresponds to a peer IMS device with complementary characteristics, able to properly negotiate the cryptographic suite and keys to use.

Figure 7B:
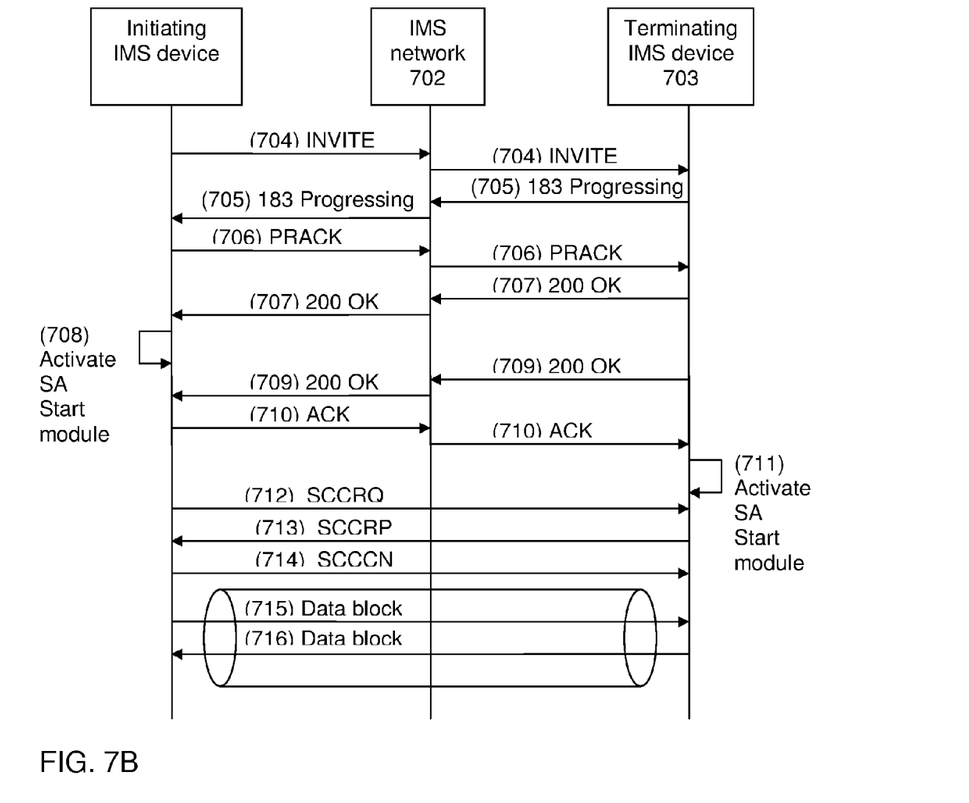

FIG. 7B illustrates a more detailed method of establishing an end-to-end transparent tunnel between two peer IMS devices 701, 703 that is in accordance with this invention. The devices 701, 703 are configured according to the IMS device 600 described above. It will be appreciated that the method is not limited to the particular SIP messages described below as other messages and other protocols are suitable. In advance of carrying out the method, an initiating IMS device 701 has built a list of identifiers corresponding to the set of cryptographic suites that it supports and may have derived one or more keys for authentication and/or encryption for each of those cryptographic suites from the keys used to secure its SIP communication to an IMS network 702. The keys that secure either IMS device's SIP communication cannot be derived from the keys for the cryptographic suites in a computationally feasible way.

The initiating IMS device 701 includes the list of identifiers and the corresponding keys in an SDP body that it appends to a SIP INVITE 704 that it sends to a public user identity of the terminating IMS device 703 with which the tunnel is to be established. The terminating IMS device 703 receives the INVITE message 704 and extracts the list of cryptographic suite identifiers and the corresponding keys from the SDP body in the message. The terminating IMS device 703 checks whether it supports any of the suites identified in the list, for example by determining for each identifier whether it supports the corresponding cryptographic suite and, if not, removing that identifier from the list.

From the keys it used to secure the SIP communication to the IMS network, the terminating IMS device 703 derives keys for authentication and/or encryption for at least one of the cryptographic suites in the received list that it supports. The terminating IMS device 703 includes an updated list of cryptographic suites and corresponding keys in the SDP body of a provisional response message 705 that it sends to initiating IMS device 701. For example, the provisional response message can be a SIP 183 PROGRESSING message. The updated list can be the list that remains after the terminating IMS device has removed the identifier(s) of cryptographic suite(s) that it does not support from the list received from the initiating IMS device.

The initiating IMS device 701 receives the provisional response 705 from the terminating IMS device 703, and selects one identifier and its corresponding keys from the updated list of identifiers and keys in the SDP body of the response 705. The initiating IMS device returns the selected identifier and its corresponding keys to the terminating IMS device 703 in the SDP body of a SIP PRACK message 706. On receiving the PRACK 706, the terminating IMS device extracts the suite identifier and corresponding keys included in the SDP body of the PRACK message, and sends a final response message 707, such as a SIP 200 OK, to the initiating IMS device. At this point, the initiating and terminating IMS devices have agreed on a cryptographic suite.

The initiating IMS device 701 creates a local SA configured to authenticate and/or encrypt data packets exchanged with the terminating IMS device 703 using the agreed-on cryptographic suite, and starts a software module 708 that implements the transparent tunneling protocol supported by the device, bound to use the SA just created. The initiating IMS device applies its own keys to outbound data packets 715, i.e., data blocks sent to the terminating IMS device, and keys obtained from the terminating IMS device to inbound data blocks 716, i.e., data blocks sent to the initiating IMS device.

The terminating IMS device 703 includes its own keys for the agreed-on cryptographic suite in a modified SDP body that it appends to another final response message 709, such as a SIP 200 OK, that it sends to the IMS initiating device 701. After receiving the message 709, the initiating IMS device 701 sends an acknowledgement message 710, e.g., a SIP ACK message related to the SIP INVITE 704/final response 709 exchange as mandated by the SIP specification. The artisan will understand that the particular message exchanges described in this application are examples and that others can be used.

The terminating IMS device 703 creates its own local SA configured to authenticate and/or encrypt data packets exchanged with the initiating IMS device 701 using the agreed-on cryptographic suite, and starts a software module 711 that implements the transparent tunneling protocol supported by the device, bound to use the SA just created. The terminating IMS device applies its own keys to outbound data packets 716, i.e., data blocks sent to the initiating IMS device, and keys obtained from the initiating IMS device to inbound data blocks 715, i.e., data blocks received from the initiating IMS device.

The initiating IMS device 701 sends the terminating IMS device 703 a tunnel establishment request message 712 according to the transparent tunneling protocol being used. Such a message 712 can be a start control connection request (SCCRQ) message according to the L2TP specification. The terminating IMS device 703 sends the initiating IMS device 701 a tunnel establishment response message 713 that indicates the tunnel is established from the terminating IMS device's viewpoint. Such a message 713 can be a L2TP start control connection reply (SCCRP) message. The initiating IMS device 701 sends the terminating IMS device 703 a tunnel establishment response message 714 that indicates the tunnel is established from the initiating IMS device's viewpoint. Such a message 714 can be a L2TP start control connection connected (SCCCN) message.

Figure 8:
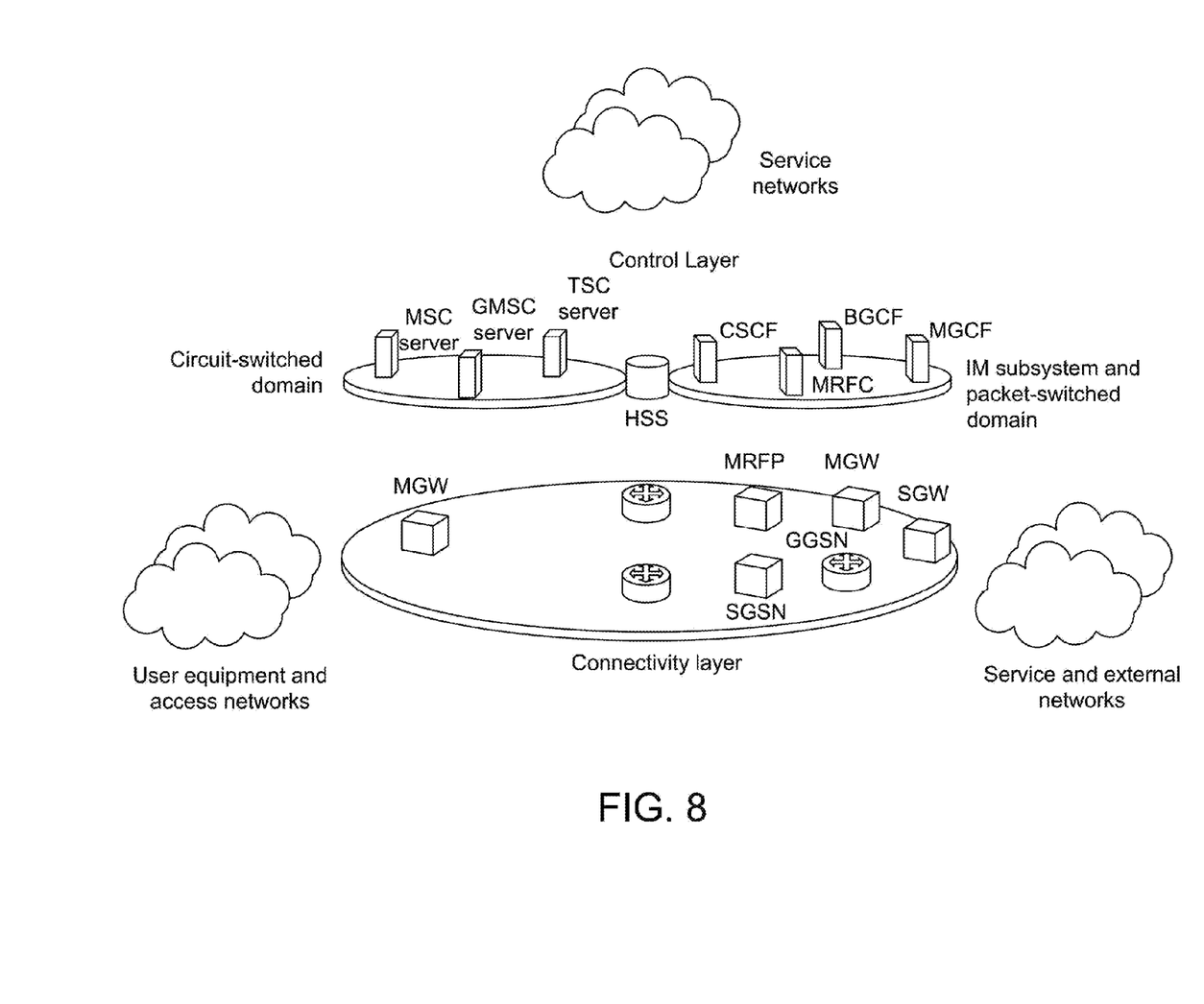
FIG. 8 depicts a network.

The artisan will understand that the methods and apparatus described in this application can be implemented in many types of electronic communication networks, and in particular in mobile radio networks. For easier understanding, a mobile radio network may be organized based on functionality in a control layer or plane, a connectivity layer or plane, and an application layer or plane, as depicted in FIG. 8. In this depiction, UEs and radio access networks are depicted by "clouds", and other networks and entities, such as the public and private networks described above, are depicted by other clouds. Such an organization is described in more detail in, e.g., H. Hameleers et al., "IP Technology in WCDMA/GSM Core Networks", *Ericsson Review* No. 1, pp. 14-27 (2002). The control layer hosts network control servers that include programmed processors and are in charge of call or session set-up, modification, and release. The control servers might also handle mobility management, security, charging, and interworking functions that relate to external networks at the control plane level. The connectivity layer hosts routers, switches, signaling gateways, media gateways (MGWs), and other user-plane functions. The routers and switches provide transport capabilities for traffic on the control and user planes.

The MGWs facilitate interworking on the user plane, including interworking between different radio access technologies and media formats.

The interface between the control layer and the connectivity layer mainly consists of gateway control protocols. The network control servers use these interfaces to manipulate MGW resources in the connectivity layer. The application layer, which is implemented as part of the service network, hosts application and content servers.

Two interfaces between the core network and a service network are a horizontal interface and a vertical interface. The horizontal interface between the core network and a service network refers to regular peer-to-peer or client/server mode of operation for typical end-user applications, such as Web browsing, e-mail, and audio/video services. These applications are normally invoked by an end-user but might also be invoked by an application server. The vertical interface enables applications that reside on specific application servers to complement or modify the normal procedures for setting up calls or sessions through the core network. These applications interwork with the core network through a set of standardized application program interfaces (APIs).

In a circuit-switched (CS) domain, a mobile services center (MSC), gateway MSC (GMSC) and transit services switching center (TSC) servers are part of the control layer. A corresponding MGW belongs to the connectivity layer. In a packet-switched (PS) domain, both a serving GPRS support node (SGSN) and a gateway GPRS support node (GGSN) can be considered to be part of the connectivity layer—they contain some control functionality—but their dominant functionality lies in providing IP connectivity. With 3GPP, a "domain" added to the mobile core network is the IMS, which has as principal network entities a call/session control function (CSCF); a media gateway control function (MGCF); a breakout gateway control function (BGCF); a media resource function (MRF) control part, or MRFC; a MRF processing part (MRFP); a media gateway (MG); and a signaling gateway (SG). The HSS, which is a master subscriber database, is common to CS domain, the PS domain, and the IMS.

Figure 9:
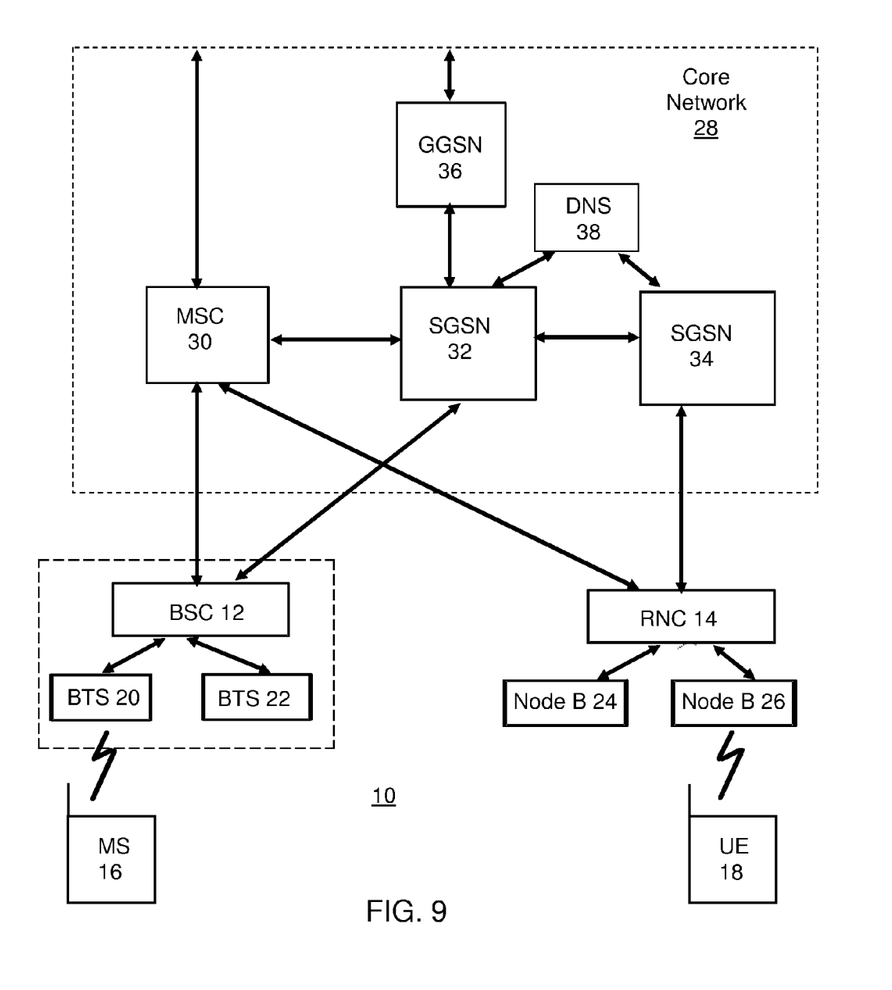
FIG. 9 depicts a portion of the network of FIG. 8 in more detail.

FIG. 9 depicts a portion of the network shown in FIG. 8 in more detail. The network 10 includes a base station controller (BSC) 12 and a radio network controller (RNC) 14 that control various radio network functions, including for example radio access bearer setup, diversity handover, etc. More generally, the BSC and RNC direct connections to/from mobile stations (MSs) 16 and UEs 18, which may be mobile telephones or other remote terminals, via the appropriate base transceiver station(s) (BTSs) and Node Bs, which communicate with each MS and UE through downlink (i.e., BTS/Node B to MS/UE) and uplink (i.e., MS/UE to BTS/Node B) channels. BSC 12 is shown coupled to BTSs 20, 22, and RNC 14 is shown coupled to Node Bs 24, 26. Each BTS/Node B serves a geographical area that can be divided into one or more cell(s). The BTSs/Node Bs are coupled to their corresponding BSC/RNC by dedicated telephone lines, optical fiber links, microwave links, etc. A BSC and its connected BTSs generally comprise a base station system (BSS), as indicated by the dashed lines in FIG. 9.

The BSC 12 and RNC 14 are connected to external networks such as the public switched telephone network (PSTN), the Internet, etc. through one or more nodes in a core network 28. As depicted in FIG. 9, the core network 28 includes a mobile switching center (MSC) 30, and packet radio service nodes, such as SGSNs 32, 34, and a gateway GPRS support node 36. Also shown in FIG. 9 is a domain name system (DNS) server 38 that is provided for internet protocol (IP) address resolution. It will be appreciated of course that various names can be used for the devices depicted in FIG. 9, and for simplicity, the terminals 16, 18 are commonly called UEs in this application.

Figure 10:
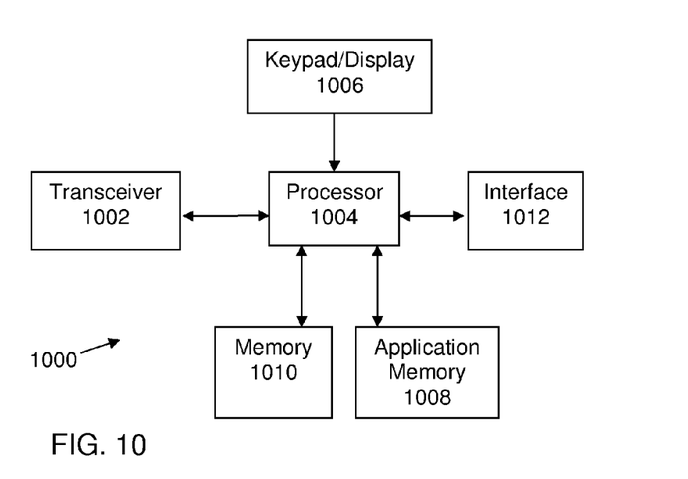
FIG. 10 is a block diagram of a user equipment suitable for the network of FIG. 8.

FIG. 10 is a block diagram of a typical UE 1000 that can implement a VPN as described in this application. As depicted, the UE 1000 includes a transceiver 1002 that is suitable for exchanging radio signals with base stations (BSs) in a network (not shown in FIG. 10). Information carried by those signals is handled by a processor 1004, which may include one or more sub-processors, and which executes one or more software modules and applications, including the modules of the IMS device 600 described in this application, to carry out the operations of the UE 1000 described above. User input to the terminal is provided through a keypad or other device, and information presented to the user is provided to a display 1006. Software applications may be stored in a suitable application memory 1008, and the device may also download and/or cache desired information in a suitable memory 1010. The device 1000 also includes an interface 1012 that can be used to connect other components, such as a computer, keyboard, etc., to the UE 1000.

This invention provides many advantages, for example, simplified tasks of dynamically setting up and tearing down IPSec tunnels, and distributing and managing keys, which greatly decrease the effort required from network administrator(s). It allows fine-tuning the usage of the IPSec tunnel by re-negotiating the encryption and authentication suites and/or keys in use on the fly, without intervention from neither the users nor the network administrator. It enables establishing communication through the VPN to a host which associated IPSec device has not yet joined the VPN.

The invention described here can be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a RAM, a ROM, and an erasable programmable read-only memory (EPROM or Flash memory).

It is expected that this invention can be implemented in a wide variety of environments, including for example mobile communication devices. It will also be appreciated that procedures described above are carried out repetitively as necessary. To facilitate understanding, aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action. It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. An apparatus for an Internet Protocol Multimedia Subsystem (IMS) device, wherein the IMS device includes a key derivation module, a tunneling protocol module, a tunnel management module, a security policies module, and an IM Subscriber Identity Module (ISIM) application or a Universal Subscriber Identity Module (USIM) application; the key derivation module obtains cryptographic keys for encryption and/or authentication of data packets by deriving the keys from the ISIM/USIM application; the tunneling protocol module supports at least one tunneling protocol that enables at least two private networks to exchange data packets over a public network in such a way that the private networks appear to be one single network to hosts connected to them; the tunneling protocol module supports at least one cryptographic suite that it can apply to incoming and outgoing data packets to encrypt/decrypt and/or authenticate the packets using keys provided by another module; the tunnel management module supports dynamic establishment and release of secure tunnels to remote devices; and the security policies module determines the at least one cryptographic suite to be used with each tunneling protocol supported by the tunneling protocol module; the apparatus comprising:
a non-volatile memory configured to store a first routing table that maps host addresses and IMS addresses of security devices allowing access to those hosts, such that when an application running in the IMS device requests communication to a host address, the apparatus initiates a Session Initiation Protocol (SIP) session establishment by sending a SIP INVITE request to the IMS address to which the host address is mapped;
wherein the INVITE request includes a Session Description Protocol (SDP) body that contains, for each tunneling protocol supported by the tunneling protocol module, data about the local tunnel endpoint, an identifier corresponding to the tunneling protocol, and identifiers corresponding to the cryptographic suite(s) supported by the cryptographic module that may be applied together with the tunneling protocol, as determined by a query from the apparatus to the security policies module; and the memory is configured to store a second routing table that maps addresses of security devices to host addresses to which the security devices allow access, such that when receiving a SIP INVITE request from a peer device including an SDP body that contains one or more identifiers of tunneling protocols, the IMS device checks that the local tunnel endpoint included in the SDP body corresponds to a security device included in the second routing table, and if so, the IMS device removes from the SDP body data relative to those tunneling protocols not supported by its tunneling protocol module and includes the remaining identifiers in the SDP body of an affirmative response to the INVITE request.

2. The apparatus of claim 1, wherein the apparatus takes the SIP session establishment affirmative response and, if no identifier of a tunneling protocol remains in the response, a SIP session establishment negative response is passed to a SIP sender which returns the negative response to the sender of the SIP INVITE request.

3. The apparatus of claim 1, wherein, for each tunneling protocol identified in the SDP body of the received SIP INVITE request, the security policies module is queried for the cryptographic suites used and the tunneling protocol, and those identifiers of the cryptographic suites not returned by the security policies module are removed from the data of the tunneling protocol in the SDP body.

4. The apparatus of claim 1, wherein, for each tunneling protocol identified in the SDP body of the received SIP INVITE request, those identifiers of cryptographic suites not supported by the tunneling protocol module are removed from the data of the tunneling protocol in the SDP body.

5. The apparatus of claim 3, wherein the apparatus takes the SIP session establishment affirmative response and, if no identifier of a cryptographic suite remains in the response, a SIP session establishment negative response is passed to a SIP sender which returns the negative response to the sender of the SIP session establishment request.

6. The apparatus of claim 1, wherein the apparatus takes the SIP session establishment affirmative response and, if at least one identifier of a cryptographic suite remains in the SDP body of the response, the response is passed as a provisional SIP response to a SIP sender, which returns the provisional SIP response to the sender of the SIP INVITE request.

7. The apparatus of claim 1, wherein the apparatus takes the SIP session establishment affirmative response and, if only one identifier of a cryptographic suite remains in the SDP body of the response, the response is passed as a final SIP response to a SIP sender, which returns the final response to the sender of the SIP INVITE request.

8. An apparatus for an Internet Protocol Multimedia Subsystem (IMS) device, wherein the IMS device includes a key derivation module, a tunneling protocol module, a tunnel management module, a security policies module, and an IM Subscriber Identity Module (ISIM) application or a Universal Subscriber Identity Module (USIM) application; the key derivation module obtains cryptographic keys for encryption and/or authentication of data packets by deriving the keys from the ISIM/USIM application; the tunneling protocol module supports at least one tunneling protocol that enables at least two private networks to exchange data packets over a public network in such a way that the private networks appear to be one single network to hosts connected to them; the tunneling protocol module supports at least one cryptographic suite that it can apply to incoming and outgoing data packets to encrypt/decrypt and/or authenticate the packets using keys provided by another module; the tunnel management module supports dynamic establishment and release of secure tunnels to remote devices; and the security policies module determines the at least one cryptographic suite to be used with each tunneling protocol supported by the tunneling protocol module; the apparatus comprising:
a non-volatile memory configured to store a first routing table that maps host addresses and IMS addresses of security devices allowing access to those hosts, such that when an application running in the IMS device requests communication to a host address, the apparatus initiates a Session Initiation Protocol (SIP) session establishment by sending a SIP INVITE request to the IMS address to which the host address is mapped;

wherein the INVITE request includes a Session Description Protocol (SDP) body that contains, for each tunneling protocol supported by the tunneling protocol module, data about the local tunnel endpoint, an identifier corresponding to the tunneling protocol, and identifiers corresponding to the cryptographic suite(s) supported by the cryptographic module that may be applied together with the tunneling protocol, as determined by a query from the apparatus to the security policies module; and on receiving a provisional SIP response to the SIP INVITE request sent, the SDP body is extracted from the provisional SIP response, and for each identifier of a tunneling protocol included in the SDP body, an identifier of a cryptographic suite is selected from those present in the SDP data associated to the tunneling protocol; the key derivation module is queried for keys suitable for the selected cryptographic suite; the obtained keys are added to the SDP data associated to the tunneling protocol; and the modified SDP body is inserted into a SIP PRACK or UPDATE request with the same target as the initial SIP INVITE request.

9. The apparatus of claim 1, wherein on receiving a SIP PRACK or UPDATE request, the SDP body is extracted from the request; from the SDP body, the remaining identifier of tunneling protocol and the associated remote tunnel endpoint and its associated data are extracted; and from the extracted data, the identifier of a cryptographic suite and keys to be used with the suite are extracted; and the extracted data, identifier, and keys are passed to the tunnel management module, which prepares to establish a tunnel to the remote tunnel endpoint using the tunneling protocol corresponding to the tunneling protocol identifier and protected with the cryptographic suite corresponding to the cryptographic suite identifier using the keys; and the key derivation module is queried for keys to be used with the cryptographic suite; the queried-for keys are included in an updated SDP body based on the received SDP body, replacing any keys present in the received SDP body; the updated SDP body is included in a final SIP response for the sender of the SIP PRACK or UPDATE request.

10. The apparatus of claim 8, wherein on receiving the final SIP response to the SIP INVITE request sent, the SDP body is extracted from the response; from the SDP body, a remaining identifier of tunneling protocol and associated remote tunnel endpoint and its associated data are extracted; and from the extracted data, an identifier of cryptographic suite and keys to be used with the suite are extracted; and the extracted data, identifier, and keys are passed to the tunnel management module for establishing a tunnel to the remote tunnel endpoint using the tunneling protocol corresponding to the tunneling protocol identifier and protected with the cryptographic suite corresponding to the cryptographic suite identifier using the keys.

11. The apparatus of claim 1, wherein the tunneling protocol module and tunnel management module are remote, and commands and responses are exchanged with the tunneling protocol module and tunnel management module according to a network protocol.

12. The apparatus of claim 1, wherein the tunneling protocol used is a Layer 2 Tunneling Protocol (L2TP) on a User Datagram Protocol (UDP).

13. A method of establishing an end-to-end transparent tunnel between a first private network and a second private network through a public network to form a virtual private network, comprising:
including in the first and second private networks a respective Internet Protocol Multimedia Subsystem (IMS) device having an IM Subscriber Identity Module (ISIM), each IMS device being configured with a set of cryptographic suites and able to exchange data blocks with respective hosts in the first and second private networks and to support a tunneling protocol;
registering and authenticating the IMS devices with respective IMS networks to which the respective ISIMs belong, and with respective IMS keys, thus establishing respective IMS secure tunnels between the IMS devices and the IMS networks;
receiving, at an originating IMS device from an originating host of the first private network, a request to submit data blocks towards a destination host identified by a network address of the second private network;
mapping the network address of the destination host into an IMS address of a destination IMS device of the second private network; and
negotiating and selecting a cryptographic suite between the originating IMS device and the destination IMS device from at least one cryptographic suite commonly supported by the originating and destination IMS devices, through respective IMS secure tunnels and IMS networks;
wherein negotiating and selecting includes:
deriving at the originating and destination IMS devices respective suite keys for the selected cryptographic suite from the IMS keys used with the respective IMS networks;
exchanging respective suite keys by the originating and destination IMS devices; and
establishing a secure tunnel between the originating and destination IMS devices through the public network by applying the exchanged suite keys with the selected cryptographic suite to data blocks exchanged by the originating and destination IMS devices.

14. The method of claim 13, further comprising:
upon request by an application to exchange a data packet with a remote host, finding, by the originating IMS device, an IMS Public Identity of the destination IMS device that allows access to the remote host by looking up the remote host's address in a host-to-IMS device mapping table; and
sending, from the originating IMS device, a Session Initiation Protocol (SIP) INVITE message to the destination IMS device, wherein a Session Description Protocol (SDP) body of the INVITE message includes a list of data structures, each data structure corresponding to a tunneling protocol available to the initiating IMS device and including a local tunnel endpoint, an identifier of the tunneling protocol, and identifiers of cryptographic suites the originating IMS device would accept to use with the tunneling protocol.

15. The method of claim 13, further comprising negotiating parameters of the end-to-end transparent tunnel by at least:
receiving, by the destination IMS device, an INVITE message sent by the originating IMS device and extracting data structures corresponding to tunneling protocols included in a Session Description Protocol (SDP) body of the INVITE message;
removing, by the destination IMS device from the SDP body, data structures corresponding to tunneling protocols undesired by the destination IMS device, and removing, from each data structure, identifiers of cryptographic suites undesired by the destination IMS device together with the corresponding tunneling protocols; and including, by the destination IMS device, an SDP body based on the removing in a provisional Session Initiation Protocol (SIP) response for return to the originating IMS device.

16. The method of claim 15, further comprising confirming establishment of the end-to-end transparent tunnel by at least:

upon receiving, by the originating IMS device, a provisional SIP response by the destination IMS device, choosing, by the originating IMS device, a tunneling protocol with corresponding cryptographic suite from those identified in the received provisional SIP response, and deriving keys for authentication and/or encryption for the chosen suite from keys used by the originating IMS device to secure SIP communication to the IMS network;

including, by the originating IMS device, identifiers of the chosen tunneling protocol and cryptographic suite and derived keys in an SDP body of a SIP P RACK or UPDATE request for sending to the destination IMS device.

17. The method of claim 13, further comprising completing establishment of the transparent end-to-end tunnel by at least:

receiving, by the destination IMS device, a Session Initiation Protocol (SIP) PRACK or UPDATE request from the originating IMS device carrying a Session Description Protocol (SDP) body that includes an identifier of a tunneling protocol with associated identifier of cryptographic suite and keys to use with the suite;

deriving, by the destination IMS device, keys for authentication and/or encryption for the suite from keys used by the destination IMS device to secure SIP communication to the IMS network;

creating, by the destination IMS device, a local Security Association (SA) configured to authenticate and/or encrypt data blocks exchanged with the originating IMS device using the suite, applying the keys obtained from the originating IMS device to inbound data blocks and the keys of the destination IMS device to outbound data blocks;

replacing, by the destination IMS device, keys received from the originating IMS device with the keys of the destination IMS device in an updated SDP body and sending the updated SDP body in a final SIP response to the originating IMS device.

18. The method of claim 14, further comprising completing establishment of the transparent end-to-end tunnel by at least:

receiving, by the originating IMS device, a final response from the destination IMS device carrying a SDP body that includes an identifier of a tunneling protocol with associated identifier of cryptographic suite and keys to use with the suite;

creating, by the originating IMS device, a local Security Association (SA) configured to authenticate and/or encrypt data blocks exchanged with the destination IMS device using the suite, applying keys received from the destination IMS device to inbound data blocks and keys of the originating IMS device to outbound data blocks; and sending, by the originating IMS device, a SIP ACK request related to the INVITE/final response exchange.

19. The method of claim 13, further comprising releasing the end-to-end transparent tunnel by at least:

sending, by a releasing IMS device to a released IMS device, a tunnel release request according to the tunneling protocol;

sending, by the releasing IMS device, a Session Initiation Protocol (SIP) BYE message to the released IMS device;

receiving, by the released IMS device, the tunnel release request and sending a tunnel release response to the releasing IMS device; and receiving, by the released IMS device, the BYE message from the releasing IMS device.

20. The method of claim 14, further comprising changing the cryptographic suites for authentication and/or encryption being used in the end-to-end transparent tunnel by at least:

selecting, by the originating IMS device, identifiers from the list exchanged in the final response that correspond to cryptographic suites for encryption and/or authentication, the suites being different from those currently being used to encrypt and/or authenticate data blocks exchanged through the tunnel;

including, by the originating IMS device, the selected identifiers and keys to use in the SDP body of a SIP INVITE message and sending the INVITE message to the destination IMS device, the INVITE message belonging to a context of a SIP session between the originating and destination IMS devices;

receiving, by a destination IMS device, the INVITE message from the originating IMS device, extracting the identifiers and keys from the SDP body in the message, and updating a local Security Association (SA) to use the new cryptographic suites and keys for authentication and/or encryption;

sending, by the destination IMS device, a final response to the INVITE received, including an SDP body with its own keys to use with the cryptographic suites selected by the originating IMS device; and receiving, by the originating IMS device, the final response that updates its local SA to use the new cryptographic suites and keys for authentication and/or encryption.

* * * * *

UNITED STATES PATENT AND TRADEMARK OFFICE
CERTIFICATE OF CORRECTION

PATENT NO. : 8,544,080 B2  
APPLICATION NO. : 12/097716  
DATED : September 24, 2013  
INVENTOR(S) : Arauz Rosado Page 1 of 1

It is certified that error appears in the above-identified patent and that said Letters Patent is hereby corrected as shown below:

In the Drawings

In Fig. 7B, Sheet 6 of 8, delete "Initiating IMS device" and insert -- Initiating IMS device 701 --, therefor.

In the Claims

In Column 17, Lines 22-23, in Claim 9, delete "SIP P RACK" and insert -- SIP PRACK --, therefor.

In Column 19, Line 18, in Claim 16, delete "SIP P RACK" and insert -- SIP PRACK --, therefor.

Signed and Sealed this  
Twenty-fifth Day of March, 2014

Michelle K. Lee  
*Deputy Director of the United States Patent and Trademark Office*